Aug. 18, 1925.
F. R. HUBER
1,550,612
FEEDER
Filed June 18, 1924    2 Sheets-Sheet 1
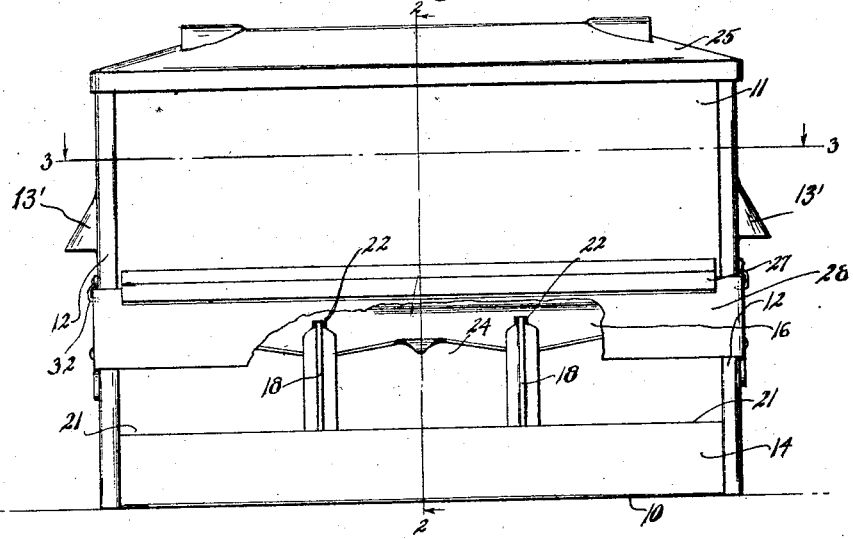
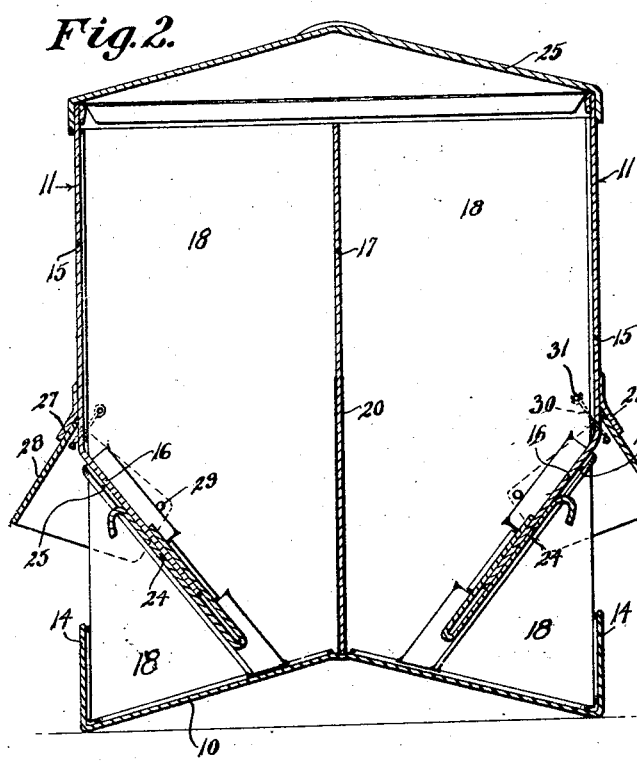
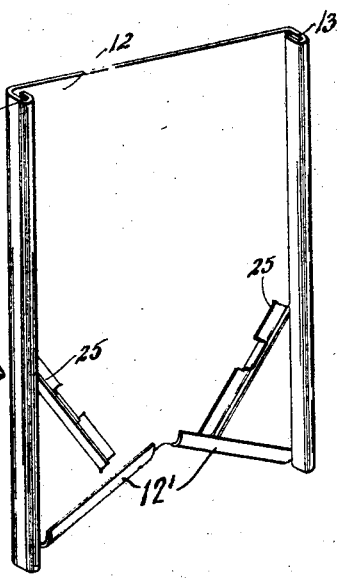
Forest R. Huber.
INVENTOR Aug. 18, 1925.

F. R. HUBER

FEEDER

Filed June 18, 1924      2 Sheets-Sheet 2

1,550,612

Forest R. Huber.
INVENTOR

BY Victor J. Evans.
ATTORNEY

WITNESS:

Patented Aug. 18, 1925.

1,550,612

UNITED STATES PATENT OFFICE.

FOREST RAYMOND HUBER, OF CENTRALIA, KANSAS.

FEEDER.

Application filed June 18, 1924. Serial No. 720,824.

*To all whom it may concern:*

Be it known that I, FOREST RAYMOND HUBER, a citizen of the United States, residing at Centralia, in the county of Nemaha and State of Kansas, have invented new and useful Improvements in Feeders, of which the following is a specification.

This invention relates to feeders, and contemplates a cheap and simple construction of a device divided into a plurality of compartments adapted to contain the same or different kinds of feed, with a door controlling the admittance of feed from each of the compartments to troughs arranged at either side of the feeders.

In carrying out the invention I also contemplate a structure wherein the various parts can be easily disassembled and folded to materially reduce the size of the feeder for shipping purposes, and which parts can also be quickly and conveniently assembled when it is desired to set up the feeder for use.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation,

Figure 2 is a transverse sectional view taken on the line 2—2 of Figure 1,

Figure 5 is a similar view of one of the end walls,

Figure 3:
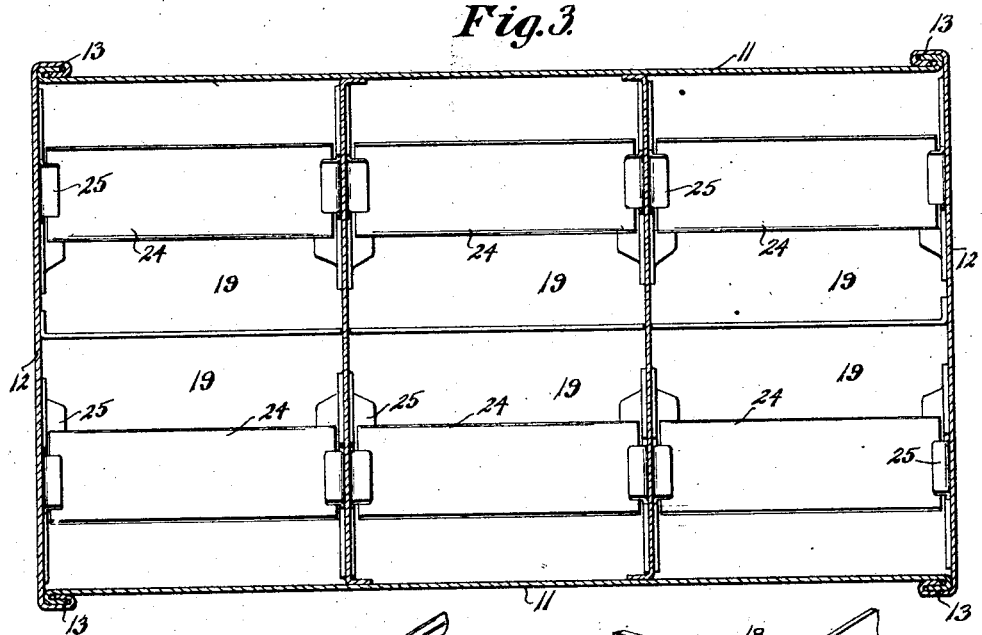
Figure 3 is a horizontal sectional view taken on the line 3—3 of Figure 1, with the hand holes 13′ omitted.

The feeder forming the subject matter of the present invention includes a bottom 10 which is formed with its respective halves inclined from the longitudinal center of the bottom toward the sides of the feeder as shown. Rising from this bottom are side and end walls 11 and 12 respectively, and these walls are associated with each other in a manner to permit said walls to be easily and conveniently assembled or disassembled as the occasion may require. In other words the said walls are connected by a slip joint 13, so that the end walls can be slipped upwardly and separated from the side walls when desired. Rising from the bottom 10 are spaced side flanges 14, and the end walls 12 slidably engage the adjacent ends of these flanges as will be readily understood.

Figure 7:
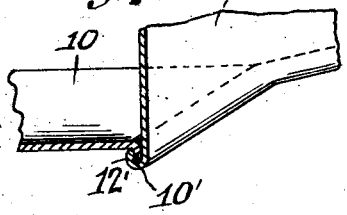
Figure 7 is a fragmentary detail sectional view showing the connection between the bottom and one end wall.

The side walls 11 are straight for a portion of their height as at 15 and then converge toward each other as at 16 to allow the bottom 10 to project beyond the sides to form a trough. It will be noted upon inspection of Figure 7 that the bottom 10 at each end is formed with a down turned flange 10′ adapted to be engaged by the flanges 12′ of the adjacent end wall 12. It will be further observed upon inspection of Figure 1 that the end walls are provided with hand holds 13′ so that the entire structure can be conveniently lifted and carried from place to place.

Figures 4, 6:
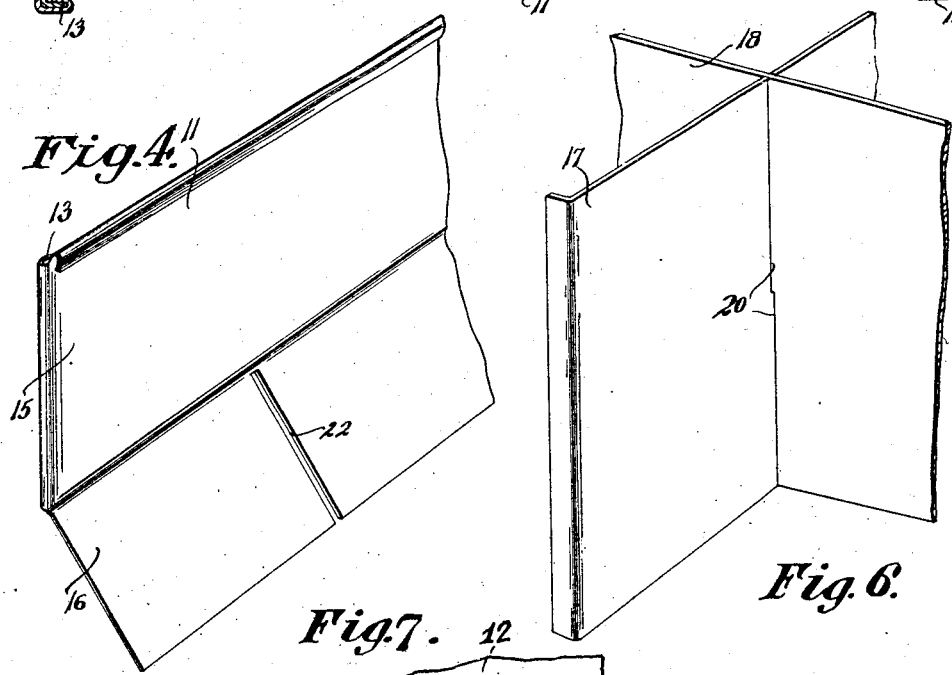
Figure 4 is a view showing one of the side walls separated from the feeder.
Figure 6 is a view showing the longitudinal and also one of the transverse partitions separated.

The feeder is divided by a longitudinal partition 17, and spaced transverse partitions 18 into a plurality of feed receiving compartments 19, which compartments are adapted to contain the same or different kinds of feed. It will be noted from inspection of Figure 6 that the longitudinal partition 17 is slotted as at 19′, as is also the transverse partitions as at 20, these slots allowing the transverse partitions to be slipped over the longitudinal partition in a manner to permit the partitions to be assembled for use or disassembled when it is desired to knock down the feeder for shipping purposes. The various compartments of the feeder of course open into the troughs above mentioned, and these troughs are divided into sections 21 by the transverse partitions 18, there being one section for each compartment of the feeder. It will be further observed that the convergently disposed portions 16 of the side walls 11 are slotted as at 22 to receive the transverse partitions 18, and it is due to this arrangement that the partitions 18 enter the troughs to divide the latter into sections. The longitudinal partition 17 and the transverse partitions 18 are removably arranged within the feeder, being of a size to terminally engage the side and end walls of the feeder which assist in holding the partitions in position for use. It is manifest however that these partitions can be easily removed from the feeder, and also subsequently separated from each other, when it is desired to knock down the feeder and arrange the component parts thereof in compact arrangement, so that the entire structure will require but a minimum of space for shipping.

Each compartment of the feeder communicates with its respective section of the trough through the space beneath the side walls 11, and this communication is controlled by a door 24. Each of the various doors is mounted for sliding movement in the convergently disposed portions 16 of the side walls, and operate in suitable guides 25. Any suitable means may be employed to hold each door in a given position, but these doors are frictionally maintained in adjusted position by frictional contact with the side walls and guides above referred to. The feeder is also provided with a removable cover 25 so that access may be readily had to any of the compartments as the occasion may require. It is manifest by reason of the construction as shown and described that feed of the same kind or of different kinds can be placed in the various compartments, and its flow into the trough regulated by the sliding doors. In other words the slides may be adjusted so that the fowls will have to work for their feed, or it may be further opened so that the sections of the trough are always kept filled. Projecting from the opposite sides of the feeder are downwardly inclined flanges 27, and positioned beneath each flange is a hood 28 which is pivoted at each end as at 29. The hood projects outwardly and downwardly from the sides of the feeder, and is supported in the position shown in Figures 1 and 2 by a rod 30 secured to the feeder as at 31, the lower end of said rod terminating to provide a hook 32 which is adapted to be received by an opening formed in the end of the hood as clearly shown in Figures 1 and 2. By releasing the hooks from the hood the latter can be dropped down to facilitate cleaning of the feeder or for any other purpose.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

A feeder of the character described comprising a knock down structure including a bottom, side and end walls, flanges rising from said bottom, slipping joints connecting the side and end walls, with the end walls slidably engaging said flanges of the bottom, whereby the body of the feeder can be disassembled, said bottom including outwardly and downwardly inclined portions to define troughs, a longitudinal partition, and transverse partitions removably arranged within the body portion and dividing the latter into a plurality of compartments, said partitions being separably connected with each other, said side walls including convergently disposed portions terminating in spaced relation to the bottom, and having slots to receive the transverse partitions, whereby the latter are utilized to divide said troughs into sections communicating with the different compartments, doors slidably mounted on the converging portions of the side walls and adapted to control the communication between the various compartments of the feeder and said sections of the trough, hoods projecting from the side walls and overlying said troughs, and a removable cover for said feeder.

In testimony whereof I affix my signature.

FOREST RAYMOND HUBER.